United States Patent [19]

Iha

[11] 3,764,202

[45] Oct. 9, 1973

[54] INDEXING MECHANISM

[75] Inventor: Kiyoshi Iha, Elk Grove Village, Ill.

[73] Assignee: Bell and Howell, Chicago, Ill.

[22] Filed: Jan. 26, 1972

[21] Appl. No.: 220,953

[52] U.S. Cl. ............... 352/123, 352/8, 274/4 F
[51] Int. Cl. ........................................ G03b 21/04
[58] Field of Search ................ 352/8, 123; 274/4 F

[56] References Cited
UNITED STATES PATENTS

| 3,561,853 | 2/1971 | Thevenaz | 352/123 |
| 3,188,091 | 6/1965 | Goodell | 274/4 F X |
| 3,512,786 | 5/1970 | Ban | 274/4 F |
| 3,244,378 | 4/1966 | Rost | 274/4 F |

Primary Examiner—Samuel S. Matthews
Assistant Examiner—Monroe H. Hayes
Attorney—Charles E. Quarton

[57] ABSTRACT

An indexing mechanism for sequentially presenting each of a plurality of cassettes containing photographic film to a projection station in a film projector. The indexing mechanism includes two pairs of stop members on sliding plates that are alternately placed in and out of engagement with an abutment on the cassettes.

4 Claims, 8 Drawing Figures

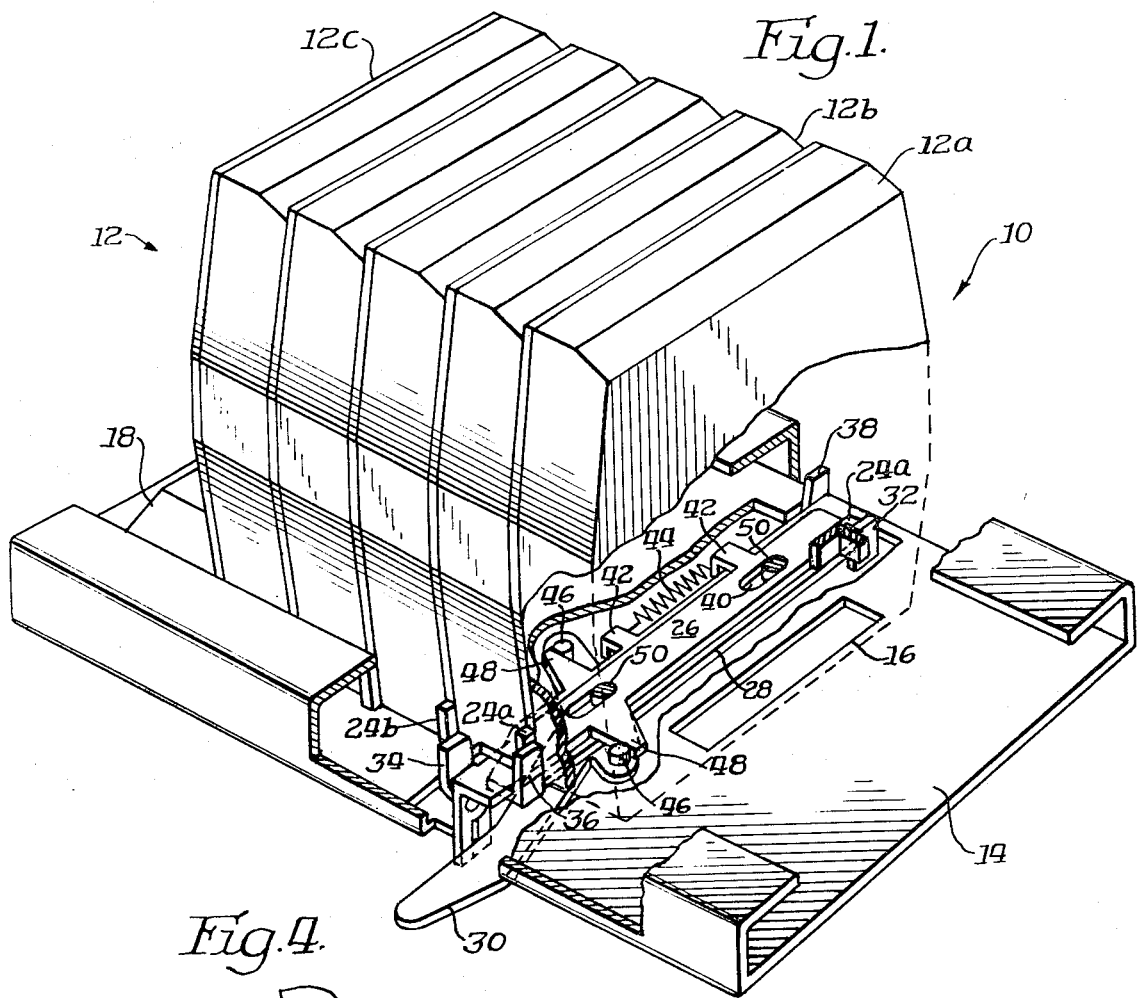
Fig.1.
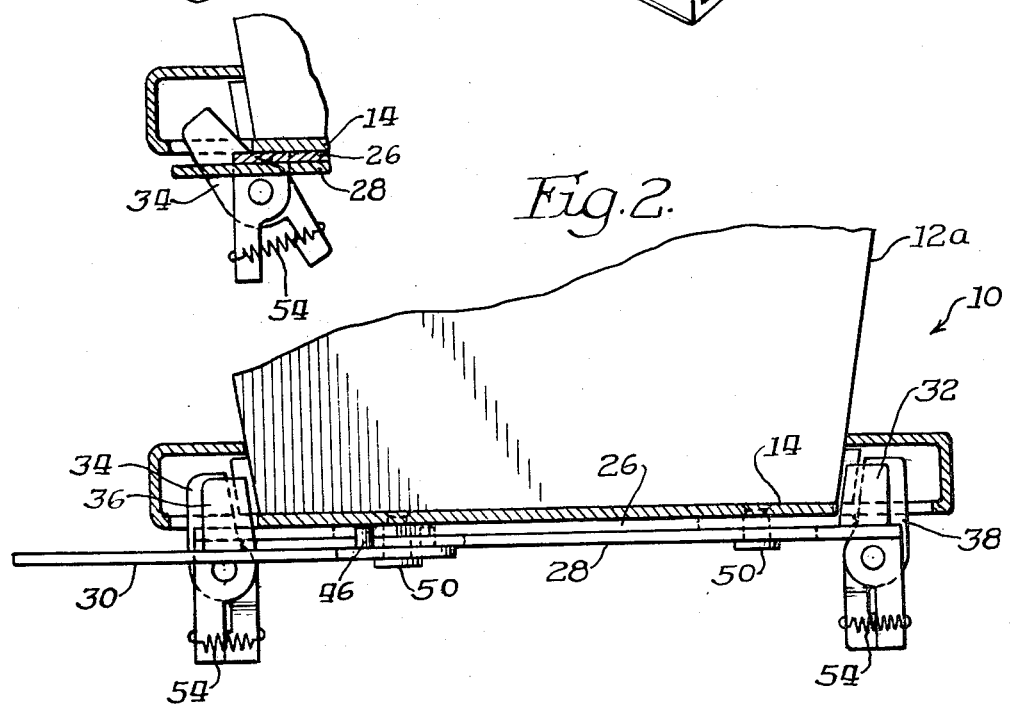
Fig.4.
Fig.2.

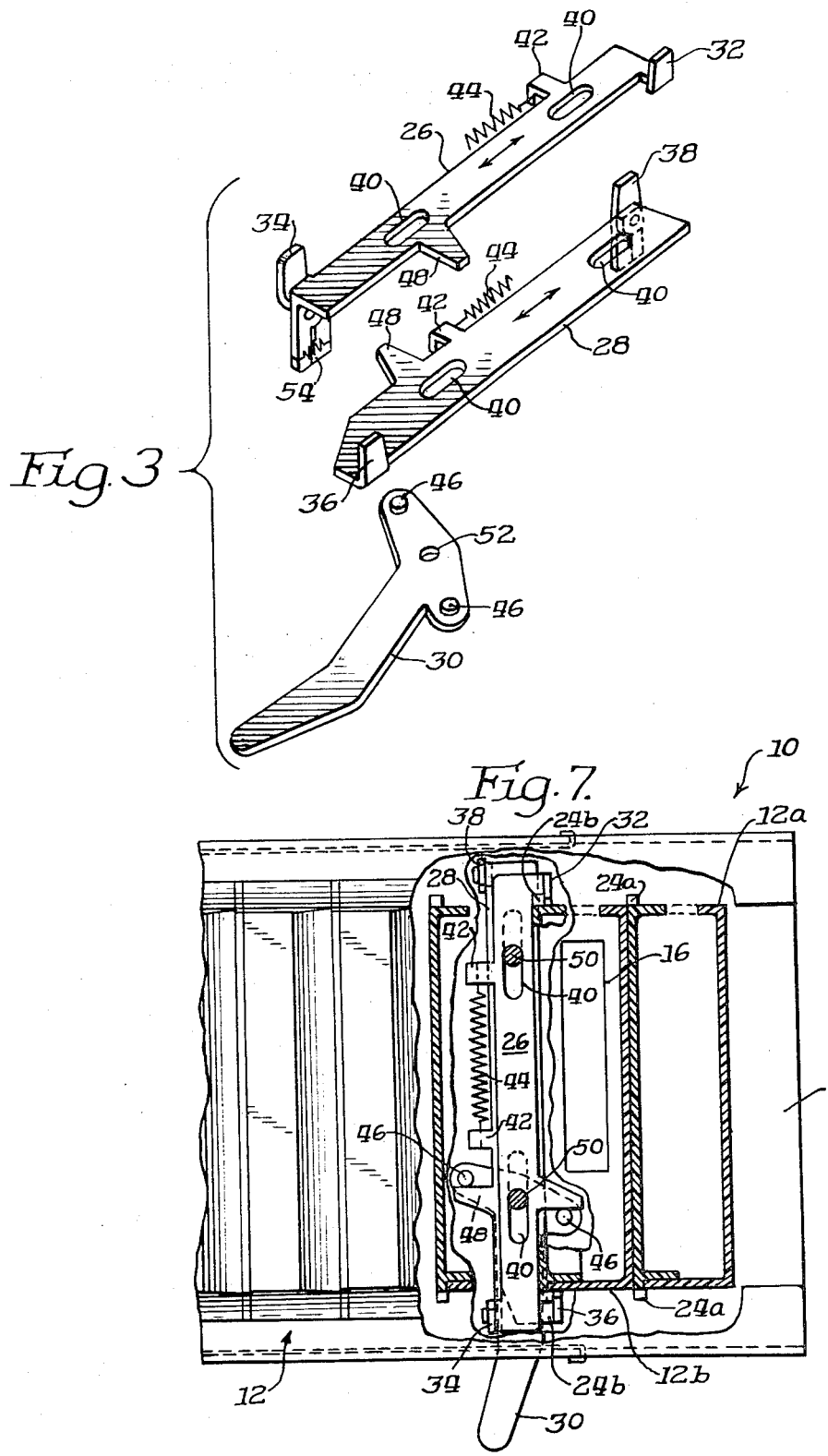

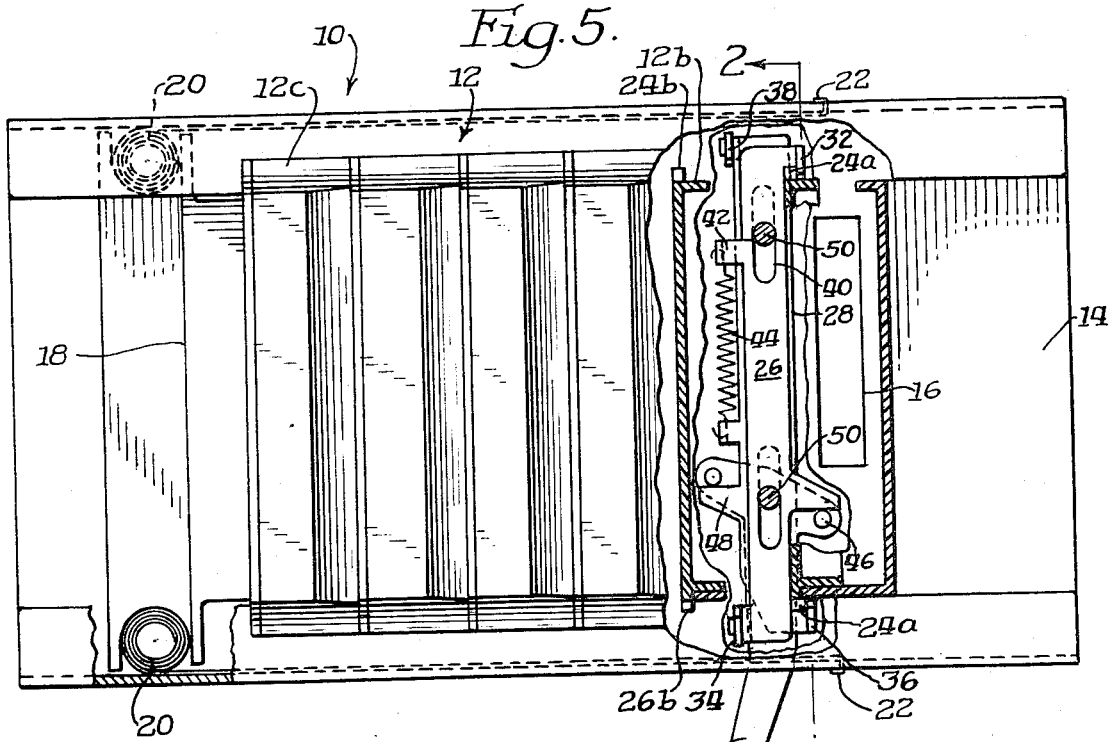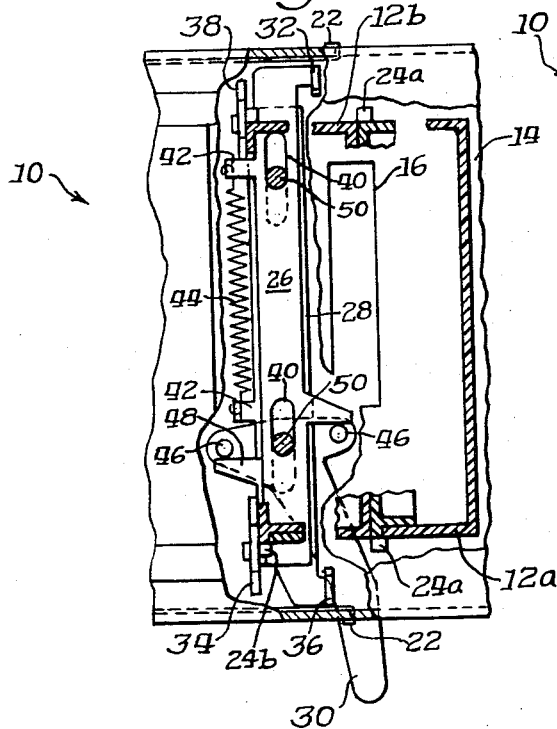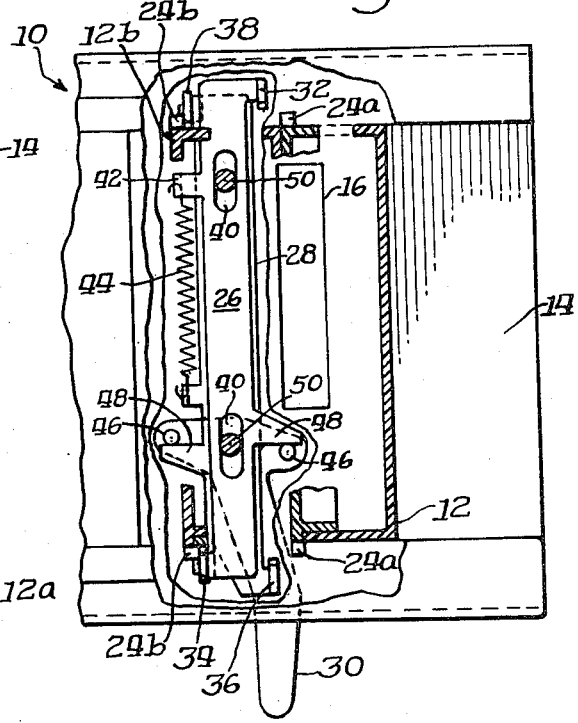

INDEXING MECHANISM

BACKGROUND OF THE INVENTION

This invention relates to film projectors and in particular to an indexing mechanism for a movie projector capable of handling film stored in a plurality of cassettes.

Movie projectors have been developed which project film contained in a cassette. Some of these projectors are designed to accept a plurality of cassettes, usually stacked in side by side relation, and to sequentially project the film contained in each cassette. These projectors require an indexing mechanism to cycle the cassettes into and out of the projection station.

Some prior projectors have included a tray into which the cassettes are placed and an indexing mechanism which indexes the tray. Because of the presence of the tray a great number of parts have been required and in general the prior indexing mechanisms have been quite complex.

SUMMARY OF THE INVENTION

To overcome the difficulties present in the prior art this invention presents an indexing mechanism which does not require a tray. The cassettes themselves move in a supply well rather than moving with a tray. Furthermore, a simplified indexing mechanism is presented which includes two pair of stop members on sliding plates that alternately engage abutments formed on each cassette. A manually operable mechanism is included to properly activate the stop members. Moreover, means are provided to simultaneously remove the stop members from the well to facilitate loading of the projector.

DESCRIPTION OF THE DRAWINGS

Features of this invention will become more apparent in the following description of the preferred embodiment read in conjunction with the figures in which:

FIG. 1 is a perspective view, partially cut away, of the supply station for a film projector including an indexing mechanism constructed in accordance with the principles of this invention.

FIG. 2 is an end view of the device shown in FIG. 1.

FIG. 3 is an exploded view of the indexing members.

FIG. 4 is a partial view of FIG. 1 in a different operating condition.

FIGS. 5, 6, and 7 are plan views, partially cut away, of the mechanism depicted in FIG. 1 and illustrating the indexing features of this invention.

FIG. 8 is a plan view, partially cut away, of the apparatus shown in FIG. 1 depicting the operating condition of the indexing apparatus when a supply of cassettes is to be loaded into the projection station.

DETAILED DESCRIPTION OF THE PREFERRED EMBODIMENT

Referring now to the drawings in which like numerals indicate like parts, FIG. 1 depicts a supply station 10 of a movie projector (not shown). The movie projector, of course, would contain all the necessary elements to project movie film. However, it has not been illustrated because it is not necessary to an understanding of this invention. A supply of five cassettes 12 are disposed in a well 14 at the supply station 10. Each cassette would contain a supply of movie film (not shown). An aperture 16 is formed in the well 14. As the aperture 16 would include the necessary mechanisms for extracting film from the cassettes 12 for projection in the movie projector, it will be referred to as the projection station.

A pusher 18 pushes the cassettes 12 toward the projection station through the action of a pair of negator springs 20. The pusher 18 is best illustrated in FIG. 5. The negator springs 20 are coupled to the sides of the well 14 at 22. In the position shown in FIG. 5 the pusher 18 acts on the last cassette 12c in the supply to urge the supply 12 toward the projection station 16.

The action of the pusher 18 is opposed by the engagement of a pair of abutments 24 formed on opposing edges of the cassettes 12 with the indexing mechanism which will now be described. Referring to FIG. 3, the indexing mechanism includes a top plate 26, a bottom plate 28 and an actuating lever 30. The top plate includes a front stop 32 and a back stop 34 for alternately engaging the abutments 24 formed on the cassettes 12. Similarily the bottom plate includes a front stop 36 and a back stop 38 for alternately engaging the abutments 24.

The plates 26, 28 include longitudinal slots 40 for mounting the plates for longitudinal sliding movement. Each of the plates 26, 28 includes a tang 42 which carry a spring 44 for urging the top plate 26 leftwardly and the bottom plate 28 rightwardly.

The lever 30 is mounted for rotation and includes a pair of pins 46. The pins 46 contact a pair of projections 48 which emanate from the plates 26, 28 such that when the lever 30 is rotated counterclockwise the plates 26, 28 slide against the force of the spring 44.

Referring now to FIGS. 1 and 2 the indexing mechanism is shown as assembled in the projection station 10. A pair of rivets 50 hold the indexing mechanism to the underside of the well 14. The rivets pass through the longitudinal slots 40 and the leftward rivet 50 passes through a mounting hole 52 formed in the lever 30. The stops 32, 34, 36, 38 protrude into the well through appropriately sized openings.

INDEXING OPERATION

In FIGS. 1 and 5 the leading cassette 12a is positioned in operational relationship with the projection aperture 16. The indexing mechanism is designed to sequentially position each cassette 12 in operational relationship with the aperture 16. In FIGS. 1 and 5 the front stops 32, 36 engage the abutments 24a on the cassette 12a.

By rotating the lever 30 counterclockwise from the position shown in FIG. 5 the top plate 26 slides upwardly and the bottom plate slides downwardly (as seen in FIG. 5) to separate the front stops 32, 36 until they no longer engage the abutments 24a. Simultaneously the back stops 34, 38 are brought into an interfering relationship with the travel path of abutments 24b formed on the second cassette 12b.

As soon as the front stops 32, 36 no longer engage the abutments 24a the pusher 18 slides the supply cassettes 12 rightwardly until the back stops 38, 34 engage the abutments 24b on the second cassette 12b, as shown in FIG. 6. It can be seen in FIG. 6 the leading cassette 12a has moved out of operational relationship with the projection station 16 and the second cassette 12b has not yet arrived at the projection station 16.

By releasing the lever 30 the spring 44 slides the top plate downwardly and the bottom plate upwardly as viewed in FIG. 6 until the back stops 38, 34 no longer engage abutments 24b. Simultaneously with the separation of the back stops 38, 34 the front stops 32, 36 are brought into an interfering relationship with the travel path of the abutments 24b.

When the back stops 38, 34 no longer engage abutments 24b the pusher 18 slides the supply 12 rightwardly until the front stops 32, 36 engage the abutments 24b as shown in FIG. 7.

In this position the second cassette 12b is now in operational relationship with the projection aperture 16. Obviously this procedure may be followed for each cassette and the supply 12.

As thus far described at least one set of stops is always in interfering relationship with the abutments formed on the cassettes. This being the case, if a user wishes to show only the first cassette in a supply it would be necessary to reciprocate the lever a sufficient number of times to cycle each cassette and the supply through the projection station in order to remove the supply from the well. To permit the quick release of the supply 12 the back stops 34, 38 are pivoted to the top plate 26 and the bottom plate 28 respectively. Springs 54 bias the stops 34, 38 into an upright position so they can be placed in interfering relationship with the abutments. However, they can be pivoted outwardly.

In FIG. 8 the lever 30 has been rotated counterclockwise to the limit of such rotation. When this position is effected the front stops 32, 36 are at the extreme of their separation and the back stops 38, 34 are pivoted out of an interfering relationship with the travel path of the abutments because they contact the side of well 14 and pivot outwardly as shown in FIG. 4. In this position the pusher will slide the supply leftwardly without having the indexing mechanism interfere with the sliding movement. Thus the supply 12 may be rapidly removed from the well 14.

What is claimed is:

1. In a projector for projecting film stored in a cassette, the combination comprising:

a well for receiving a plurality of said cassettes in side by side relation;

a projection aperture disposed in said well;

means for urging said cassettes toward said aperture;

top and bottom plates mounted for reciprocating sliding movement to the underside of said well, each of said plates having a front and back stops projecting into said well, said front stops being disposed to engage abutments formed on said cassette to position said cassette over said aperture, said back stops being disposed to engage said abutments and to position said cassette prior to said projection aperture; and means for sliding said plates in opposing directions to position alternately said front and back stops in interfering relationship with the travel path of said abutments.

2. The indexing mechanism in a film projector which comprises:

well means for receiving a plurality of cassettes stacked in side by side relation, each of said cassettes including an abutment means;

means in said well for urging said stack along a travel path toward a projection station in said projector;

a first plate, having a front stop and a back stop, mounted to the underside of said well for reciprocating motion in a direction substantially normal to the travel path of said stack;

a second plate having a front stop and a back stop mounted to the underside of said first plate for reciprocating motion in a direction substantially normal to said travel path;

spring means for urging said front stops toward their position of closest proximity and said back stops to their position of greatest separation; and a rotatable lever underlying said second plate including means for sliding said plates to separate said front stops and to bring said back stops to their position of closest proximity such that said front and back stops may be alternately placed into interfering relationship with the travel path of said cassettes.

3. The combination set forth in claim 2 further comprising means for removing both said front and back stops from said interfering relationship.

4. The combination set forth in claim 3 wherein said back stops are pivoted to said plates and are spring biased into an upright position.

* * * * *